(12) United States Patent
Brett et al.

(10) Patent No.: US 6,951,614 B2
(45) Date of Patent: Oct. 4, 2005

(54) METHOD AND DEVICE FOR FILTERING LIQUIDS, ESPECIALLY DRINKS

(75) Inventors: Elke Brett, Geisenheim (DE); Carsten Heinemeyer, Johannisberg (DE); Ralf Tesch, Karlsruhe (DE)

(73) Assignee: E. Begerow GmbH & Co., Langenlosheim (DE)

( * ) Notice: Subject to any disclaimer, the term of this patent is extended or adjusted under 35 U.S.C. 154(b) by 28 days.

(21) Appl. No.: 10/312,740

(22) PCT Filed: Feb. 14, 2002

(86) PCT No.: PCT/EP02/01540

§ 371 (c)(1),
(2), (4) Date: Dec. 30, 2002

(87) PCT Pub. No.: WO02/066140

PCT Pub. Date: Aug. 29, 2002

(65) Prior Publication Data

US 2003/0168413 A1 Sep. 11, 2003

(30) Foreign Application Priority Data

Feb. 19, 2001 (DE) .......................................... 101 08 957

(51) Int. Cl.[7] .......................... B01D 29/52; B01D 59/56; B01D 29/62
(52) U.S. Cl. ........................... 210/741; 210/90; 210/94; 210/108; 210/134; 210/333.01; 210/335; 210/341; 210/791
(58) Field of Search ........................... 210/85, 94, 96.1, 210/96.2, 106, 108, 141, 321.69, 332, 333.01, 333.1, 340, 341, 425, 427, 493.1, 497.1, 636, 739, 745, 791, 90, 97, 134, 335, 741

(56) References Cited

U.S. PATENT DOCUMENTS 4,980,066 A * 12/1990 Slegers ........................ 210/636
5,262,053 A * 11/1993 Meier ........................... 210/636
5,558,775 A * 9/1996 Busch, Jr. ................... 210/638
5,741,416 A * 4/1998 Tempest, Jr. ................. 210/90

FOREIGN PATENT DOCUMENTS

| DE | 3700804 | 7/1988 |
| DE | 29604290 | 6/1996 |
| DE | 19607740 | 9/1997 |
| DE | 19831946 | 2/2000 |
| JP | 05031308 | 2/1993 |
| WO | 9932206 | 7/1999 |

* cited by examiner

Primary Examiner—Joseph Drodge
(74) Attorney, Agent, or Firm—Roylance, Abrams, Berdo & Goodman, L.L.P.

(57) ABSTRACT

A method for filtering liquids, especially drinks, is by a filtering device having at least two filter lines. Each filter line has at least one filter unit with at least one preliminary filter and one terminal filter which can be connected to or disconnected from the respective filter line independently of each other and which can also be independently regenerated. The pressure differential of at least one filter unit on each filter line is measured. Once a predefinable threshold value is reached for the pressure differential, the volume flow entering the device is reduced. The associated filter unit is disconnected from the filter line. The reduced volume flow to be filtered is handled by the corresponding filter unit in the other filter line which is fluidically connected to the filter line between the respective preliminary filter and the respective terminal filter. The disconnected filter unit is regenerated. The filter unit which is purified by regeneration is subsequently reconnected to the filter line and the volume flow entering the device is increased once more.

21 Claims, 3 Drawing Sheets

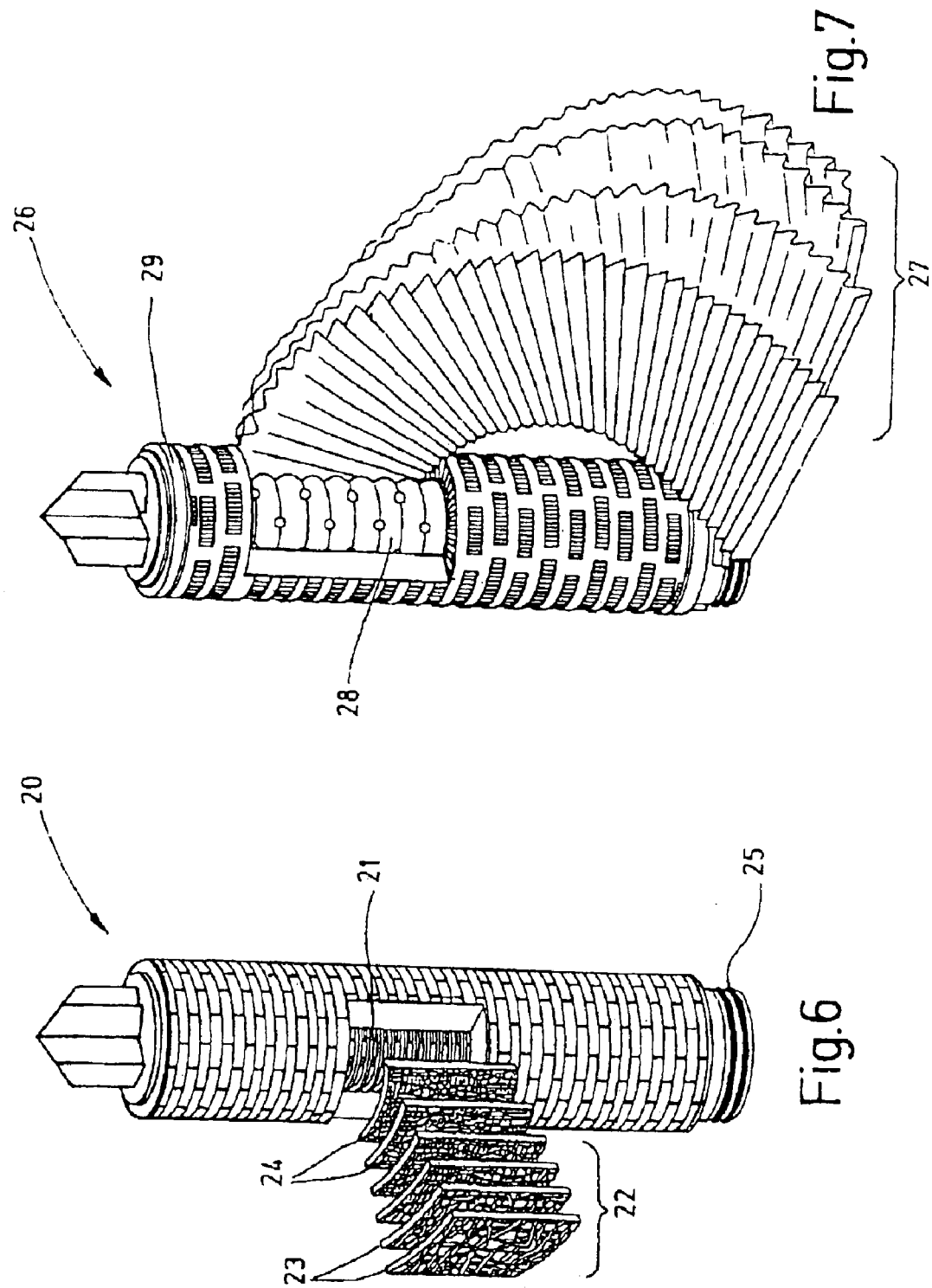

METHOD AND DEVICE FOR FILTERING LIQUIDS, ESPECIALLY DRINKS

FIELD OF THE INVENTION

The present invention relates to a method and a device for filtering liquids, especially drinks. The filtering device has at least two filter lines, each having at least one filter unit. The process and the device may be employed in production of at least partly fermented fruit juices, wine in particular.

BACKGROUND OF THE INVENTION

Solid/liquid separation operations must be performed in different process steps in the production of wine and fruit juice. This separation may be accomplished by conventional separating processes such as sedimentation, centrifuging, cake filtration, etc., or by so-called "cross-low filtration" as described in the publication by Karbachsch, M., Pototschnigg, S., and Bauer, R. "Einsatz der Cross-Flow-Filtration in der Getränkeindustrie, Kellerwirtschaft" [Use of Cross-Flow filtration in the Beverage Industry, Cellar Management]. This filtration differs from so-called "dead-end filtration" in that a shearing strain gradient acting transversely to the direction of filtration flows tangentially over the surface of the diaphragm. Formation of a cover layer on the surface of the diaphragm is suppressed or reduced to the minimum as a result. Disadvantages of cross-flow filtration are that the type of particles to be separated cannot be affected and that the liquid to be filtered must be circulated by pump until passage through the diaphragm occurs. The associated mechanical and/or thermal stress applied to the liquid to be filtered often results in loss of quality.

The so-called kieselguhr filtration technique is often employed for prefiltering conventionally. However, filtration free of yeast can be achieved only at great cost, even when medium-fine or fine kieselguhr is used. In addition, the kiesetguhr used must be replaced after a period of operation depending, among other things, on the particle charge of the liquid to be filtered. The used kieselguhr must be disposed.

To permit continuation of filtration during cleaning of a filter or other maintenance operations, so-called standby filter lines are often provided and are engaged only if a filter line in operation must be shut down. The result is that a significant part of the filtration equipment, the elements of the standby line, remain largely unused even though they must be kept ready for use.

DE-A-196 07 740 A1 discloses a filtration system with a preliminary filtering stage including three preliminary filter housings and an end filtering stage including two end filter housings. The end filtering stage is mounted downstream from the prefiltering stage as a specific modular unit. Each of the housings has a pressure differential measurement device by means of which the pressure differential between housing inlet and housing outlet is determined in each instance. The accompanying "flux" is determined by the volume flow equipment serving simultaneously as volume metering equipment and being mounted in the filtrate collecting line. In customary filtration, only a preliminary filter housing together with an end filter housing mounted in line performs the filtration. Every possible combination is conceivable, that is, while the preliminary filter lines and the end filter lines are controlled on the same principle, they are controlled separately and with different limiting values. A system designed for this purpose is usually employed for lime disinfection of beer or the like. Operation of the system in which several preliminary filter stages and end filter stages are used simultaneously side by side is not possible with the conventional systems. This aspect restricts their efficiency correspondingly. Even if regeneration of a preliminary filter or end filter is carried out, only a preliminary filter or an end filter remains in the filter line at all times. This limitation is a factor contributing to the very low efficiency of the conventional system.

In addition, the conventional filtration system is operated with a constant flow volume, something which may result in blocking of the respective preliminary filter or end filter, if one of the filters is removed from the filtration process, either deliberately or unintentionally, or becomes unusable, as a result of fouling, for example.

DE-A-37 00 804 discloses a process and a system for concentration of substances present in dispersed or colloidal solutions from a greatly diluted initial product by ultrafiltration, in particular for preparation of active ingredients in the medical or pharmaceutical fields. After preliminary selection of the parameters represented by supply pressure and pressure differential, a control unit is used to keep the pressure differential constant during an ultrafiltration program by acting on the supply flow of the pump and by acting on the counterpressure by a choke. An optimal filtration result is obtained throughout the program, despite the varying viscosity of the material to be filtered. Hence, the conventional solution discloses reduction in the volume flows as a function of the pressure differential in ultrafiltration systems. In each instance, a battery of filter elements is connected in series parallel to each other in a circuit taking unfiltered material from a common reservoir. In synchronous operation, they pass the filtrate on continuously to a common collecting point during operation. No provision is made in this process for regeneration of individual filter elements.

SUMMARY OF THE INVENTION

Objects of the present invention are to provide a process and a device for filtering liquids, beverages in particular, which are fully automated to the greatest extent possible, have the lowest possible investment, operating, and maintenance costs, and yield a filtrate of the highest possible quality, and in the case of wine filtration a filtrate free of yeast.

According to the present invention, a filter unit, when the pressure differential between the preliminary filter side and the main filter side exceeds a preset limiting value, is removed from the corresponding filter line, regenerated, and then introduced into the filter line. The limiting value may be preset manually or by an automatically running optimization program. Regeneration is effected preferably by backwashing. As an alternative or in addition, the filter unit to be regenerated may also be forward washed and/or chemically regenerated.

A filter unit generally has a filter housing and a filter element, a filter cartridge for example. An increased volume flow would be applied to the filter units remaining in operation as a result of removal of the filter unit to be regenerated. This increased volume flow could lead to problems, as for example, blockage of used filter cartridges. For this reason, the volume flow is reduced before or during removal of the filter cartridge to be regenerated. A negative effect exerted by the filter units remaining in operation is thereby prevented. This process may be fully automatically operated by use of a suitable control device, one which has the pressure differentials occurring on the filter units, for example, as input variables. The volume flow entering the device is adjusted preferably by a pump controlled by the control unit.

The filtering device is made up of at least two filter lines combined as modular units. The filter lines are connected in parallel. Each filter line has a preliminary filter and an end filter. Several preliminary filters and/or several end filters and/or intermediate filters introduced between preliminary filters and end filters may be provided. The connecting point between two filter units of a filter line is connected by a transverse line to the respective connecting point of at least one other filter line. Consequently, all preliminary filter and end filter units are in operation in the normal operating situation. Because of the transverse line with its connections to the two filter lines, each filter unit may be connected to and disconnected from the filter line, and may be regenerated independently of the other filter unit, particularly by backwashing. After regeneration, for example, of the preliminary filter in the first filter line, before final increase of the volume flow entering the device, the preliminary filter of a second filter line may also be regenerated, particularly by backwashing. Such regeneration is effected preferably by backwashing with water at a temperature higher than 60° C. The cleaning effect from the backwashing and/or the service life of the filter element may be increased by having the velocity of the approach flow from the initial direction be equal to or greater than in filtration, at least at the beginning of the backwashing. If the pressure differential at the filter element is also measured in backwashing, especially the variation over time, a conclusion may be drawn as to the efficiency of the backwashing process.

If the pressure on the inlet or outlet side of a filter unit is known or firmly preset, the pressure differential may also be determined by simple measurement of the pressure on the outlet or inlet side. All conventional processes are appropriate for the pressure sensors and their use. The pressure sensors preferably provide the control device with an electric output signal meeting preset standards, for example 4 to 20 mA output current, 0 to 10 volts output voltage, or the signal is digitally coded. The measured value involved may also be displayed directly at the pressure sensor.

As a result of control of the volume flow entering the device by the pressure differentials occurring at the filter units and/or in accordance with the concentration of particles in the liquid to be filtered, the filterability of the fluid to be filtered becomes an operating variable for the filtering efficiency of the device. The particle concentration and, optionally, the particle size distribution as well, may be measured in different ways. For example, an optical sensor may be used for this purpose. One or more commercially available data processing systems, including a personal computer, for example, may be used to process a preset control program. The control program may also operate in a self-optimizing mode, for example in that the variation in the pressure differentials occurring over time are stored and the frequency and duration of the regeneration processes, along with the limiting value for the pressure differential which triggers the regeneration, are set in accordance with optimal efficiency of the filtering process. The filterability of the liquid may be determined, for example, by index measurement in accordance with DE 198 31 946 A1, turbidity measurement, measurement of the particle concentration, and/or by a test filter.

Preference is to be given as filter elements to wound and/or pleated filter cartridges, so-called deep filter cartridges in particular. Wound filter cartridges preferably have several layers of shear wool, of polypropylene for example, the outer layers preferably being coarser than the inner layers. Typical approach flow velocities for such filter cartridges are situated, for example, below 1000 l/h, especially around 400 l/h. Preliminary filters, for example, are filter cartridges with a deposition rate (nominal) of more than 2 $\mu$m, while the corresponding deposition rates for the end filters are below 2 $\mu$m. In contrast to cross-flow filtration, this process involves so-called static filtration. The filter units of the filter lines may be switched optimally from one to the other from top to bottom by corresponding valves. For example, the preliminary filter of a first filter line may be switched to connect to the first and second filter lines, while the preliminary filter of the second filter line is undergoing backwashing.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 6 is a perspective view of a wound filter cartridge for a filtration device according to an embodiment of the present invention; and FIG. 7 is a perspective view of a pleated filter cartridge for a filtration device according to an embodiment of the present invention.

DETAILED DESCRIPTION OF THE INVENTION

Figure 1:
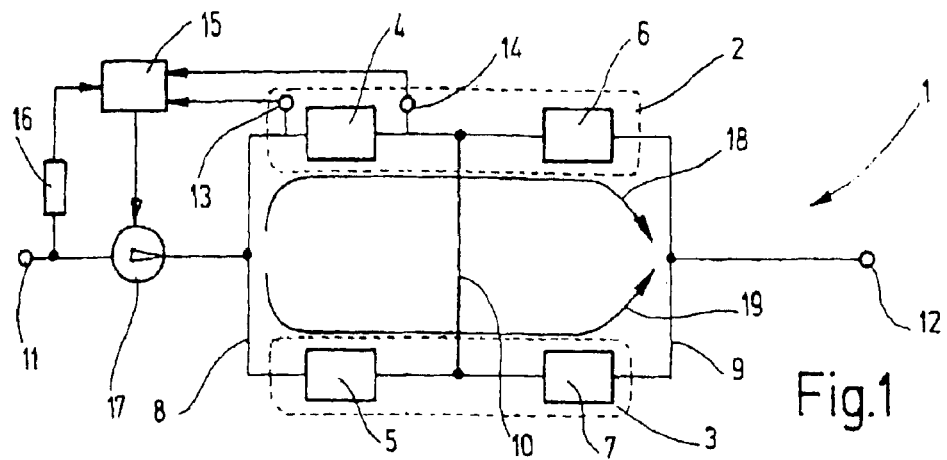
FIGS. 1 to 4 are in diagrammatic views of a filtration device in various operating states of a process according to embodiments of the present invention.

FIGS. 1 to 4 illustrate in diagrammatic form various operating states of the process of the present invention for filtering liquids, particularly beverages, with a filter of filtration device 1. 1 the exemplary embodiment illustrated, the filter device has two filter lines 2, 3. Each filter line 2, 3 has of a preliminary filter or filter unit 4, 5 and an end filter or filter unit 6, 7, respectively. The filter device 1 may analogously have other filter lines and/or each filter line other filter units. The preliminary filters 4, 5 are connected on the inlet side to a collective inlet line 8. The end filters 6, 7 are on the outlet side connected to a collective outlet line 9. The preliminary filters 4, 5 of the first and second filter lines 2, 3 may be interconnected by way of a transverse line 10.

For the sake of clarity, the accompanying valves for engaging or disengaging the connecting lines between inlet 11 and the preliminary filters 4, 5, the end filters 6, 7, and the outlet 12 and between preliminary filters 4, 5, and end filters 6, 4, including the transverse line 10, are not shown. Also for the sake of clarity, a pressure sensor 13, 14 which emits signals forwarded to the control device 15, is shown only for the first preliminary filter 4 on its inlet and outlet sides. In addition, the control device receives a signal from a sensor 16 which determines the particle concentration in the liquid to be filtered. This control device 15 in turn controls the pump 17, and accordingly, the volume flow to be filtered.

FIG. 1 illustrates the state of the device when there is flow through all filter units 4, 5, 6, 7. In particular, two filter paths 18, 19 are formed by the first or second filter lines 2, 3. The transverse line 10 may be open or closed in this operating situation. For a preferred application of this invention, filtration of wine, the volume flow is, for example, at about 600 l/h. The preliminary filters 4, 5 have a (rated) separation rate greater than 2 μm, while the end filters 6,7 have a corresponding separation rate lower than 2 μm. The filtered wine may be removed at the outlet 12.

Figure 2:
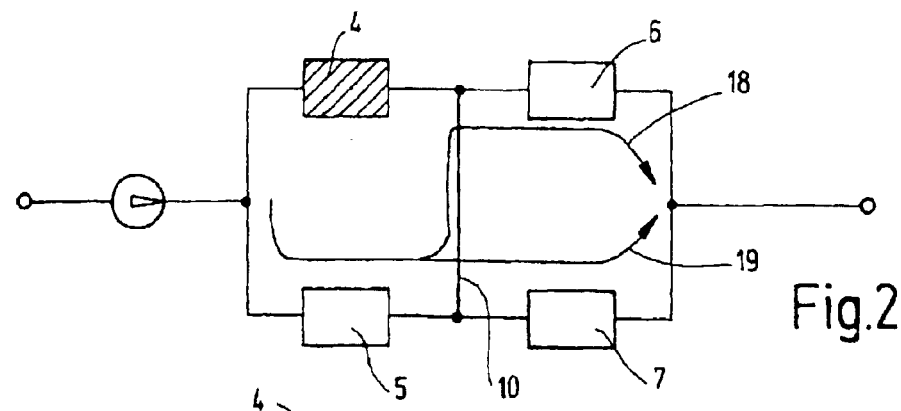

FIG. 2 shows an operating situation in which the first preliminary filter 4 is disengaged from the first filtering path 18 after the pressure differential, as determined by the control device 15 in accordance with the signals from the pressure sensors 13, 14, has exceeded a preset limit value. The volume flow is then reduced by lowering the pump output. The reduced volume flow now moves through the only preliminary filter in operation, the second preliminary filter, 5, and subsequently is divided by the transverse line 10 between the two end filters in operation, 6, 7. After the first preliminary filter 4 has been backwashed, and thus cleaned, it is again inserted into the filtering path 18.

Figure 3:
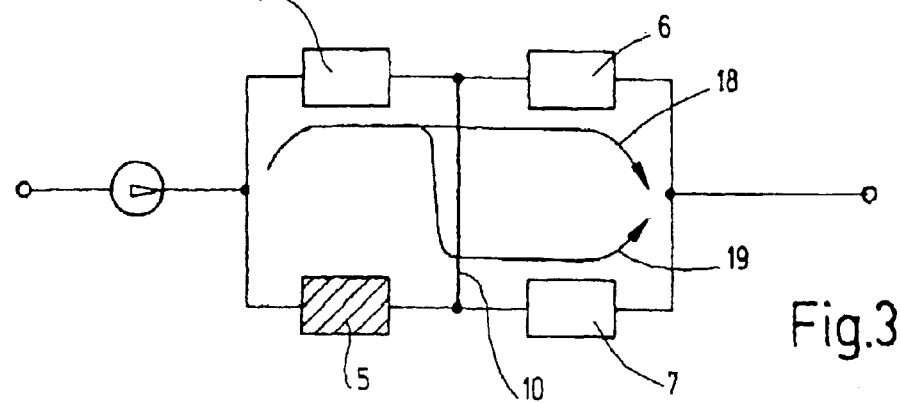
Figure 4:
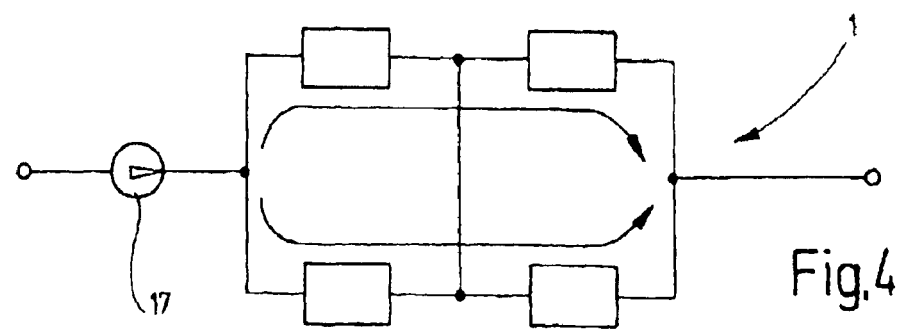

FIG. 3 illustrates the operating situation in which the second preliminary filter 5 has been disconnected from the second filtration path 19 after the accompanying pressure differential has exceeded the present limiting value or regularly in connection with backwashing of the first preliminary filter 4. In this case, the first preliminary filter 4 receives the total, subsequently reduced, volume flow, which is then divided between the two end filters 6, 7 in operation, among other things by the transverse line 10. Not until after the second preliminary filter 5 has also been backwashed, and thus, cleaned, and has been inserted into the second filtration path 19 are the output of the pump 17 and accordingly the volume flow to be filtered is again increased, preferably to the original value. As a result, the state of the device 1 shown in FIG. 4, which more or less represents the operating state illustrated in FIG. 1, is established.

Rather than two pressure sensors 13, 14 a single so-called differential pressure sensor may be employed. Such sensor either has two pressure connections for the preliminary filter side and subsequent filter side, or determines the pressure on the preliminary filter side or subsequent filter side relative to a preset pressure, and then forms the differential. The pump output or the volume flow to be filtered may be set in discrete, preset steps, in the operating situation shown in FIGS. 2 and 3, for example, at one-half the volume flow in the operating situation shown in FIGS. 1 and 4. As an alternative or in addition, it is also possible to adjust the pump output continuously in accordance with the pressure differentials occurring at the filter units 4, 5, 6, 7, for example, by steadily reducing the pump output in keeping with pressure differentials slowly rising from a preset limiting value, which may also represent a limiting value range. As a result, a backwash process which would be required in further operation under full load could be prevented, for example, when a relatively small amount remains to be filtered.

FIGS. 1 to 4 illustrate, by way of example, the operating states for backwashing of the two preliminary filters 4, 5. The process of the present invention is applied appropriately if one or both of the end filters 6, 7 are to be backwashed. It is also possible for one or more preliminary filters 4, 5 and/or one or more end filters 6, 7 to be regenerated simultaneously. Regeneration of the first preliminary filter 4 and the second end filter 7 with two filter lines 2, 3, in particular with the device 1, shown, is possible. It is essential for at least one preliminary filter 4, 5 and one end filter 6, 7 to form a filtration path 18, 19 at any point in time, so that filtration through the device 1 takes place, even if with reduced flow efficiency.

Figure 5:
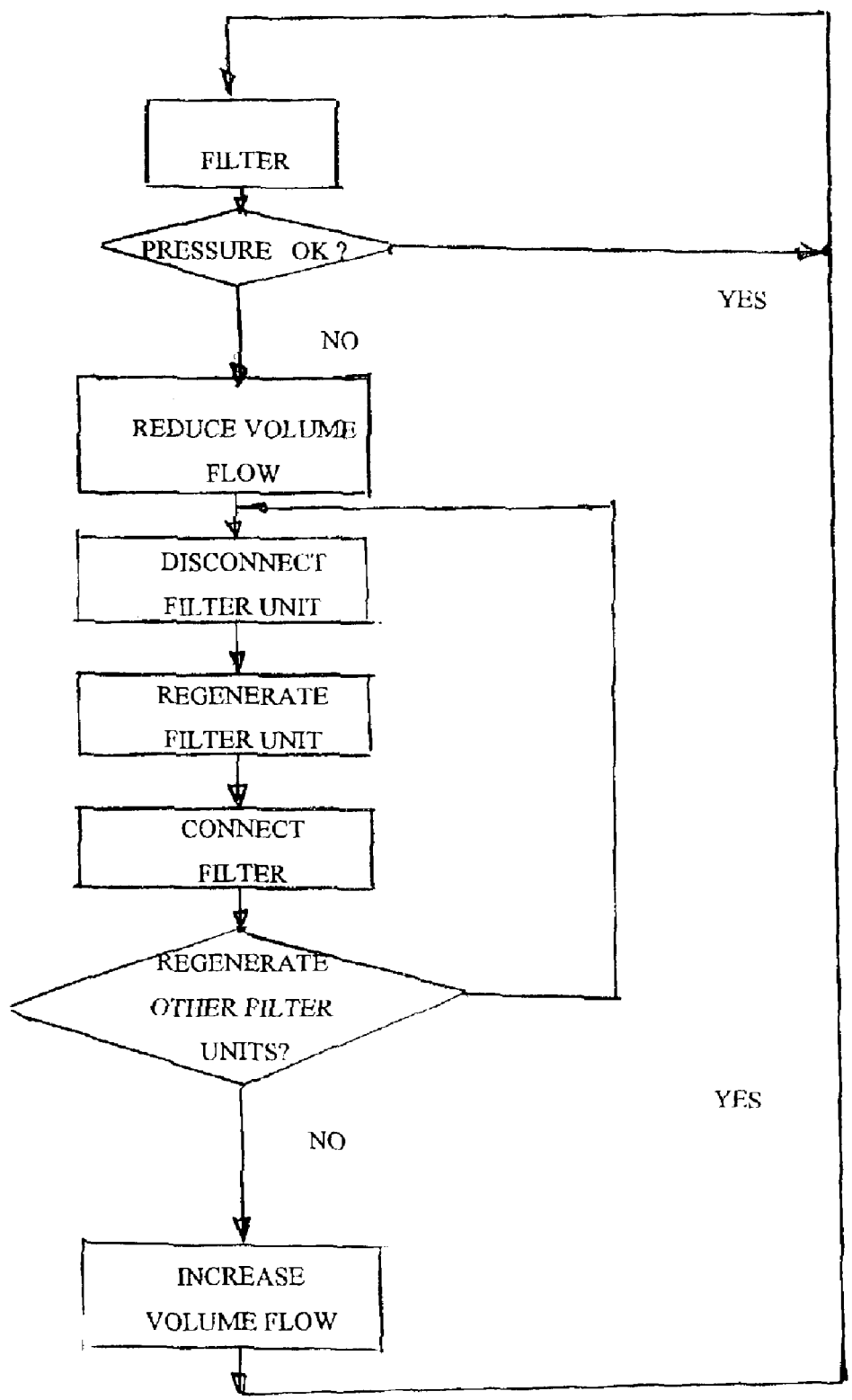
FIG. 5 is a flow chart of a process according to an embodiment of the present invention.

FIG. 5 illustrates the course of the process of the present invention on the basis of a flow chart. Starting with the initial state "FILTRATION," irregular, regular, or permanent query of the pressure differentials at least one, preferably all, filter units 4, 5, 6, 7 takes place. So long as the pressure differentials as determined are situated below a preset limiting value, the filter device 1 continues its filtering operation. The limiting values may differ for the individual filter units 4, 5, 6, 7, in particular for preliminary filters 4, 5 and end filters 6, 7.

If the control device 15 determines a pressure differential exceeding the limiting value, first the volume flow is reduced. Then, the relevant filter unit is removed from the filtration path 18, 19 and is regenerated, for example by backwashing. The pressure differential which arises may also be monitored during the backwashing. In particular, this pressure differential may be used as a gauge of the cleaning effect achieved. After the cleaning has been completed, the filter unit is introduced into the filtration path 18, 19 again.

In the particular embodiment of the present invention illustrated in FIG. 5, a query is then made to determine if other filter units 4, 5, 6, 7 are to be backwashed. Backwashing of other filter units 4, 5, 6, 7 may be carried out routinely or only when the limiting value for the pressure differential thereof is exceeded. In the event that other filter units 4, 5, 6, 7 are to be backwashed, the corresponding process steps "remove/backwash/insert filter element" are to be repeated.

If no other filter units 4, 5, 6, 7 remain to be backwashed, the volume flow is increased again, to the original rated value in particular, and the system is switched to the initial state "FILTRATION" again.

Preferably so-called filter cartridges, especially depth filter cartridges, are used as filter units 4, 5, 6, 7. These units may be wound or pleated in design.

FIG. 6 illustrates a wound filter cartridge 20 with an internal supporting tube and with several wound filter layers 22. The layers may comprise paper, textiles, plastics, or other suitable materials, of polypropylene wool in particular. The outer filter layers 23 preferably have larger pores or meshes than those of the inner filter layers 24. For example, up to 100 layers superimposed one on the other may be wound, 10 layers of which, for example, have pores or meshes of different widths. The wound filter cartridge 20 may have a support fabric, wire netting in particular, or an outer support pipe on the external circumferential surface. An O-ring 25 is introduced into each of two grooves of the filter cartridge 20 on the lower end of the pipe as shown in the drawing for sealing between the inlet and outlet sides of the pertinent filter. The direction of flow is typically from the exterior inward, so that the filtered liquid drains axially through the more or less cylindrical cavity of the inner support pipe 21. In principle, however, a direction of flow from the interior outward is also possible.

FIG. 7 shows a pleated filter cartridge 26 with pleated superimposed filter layers 27. In this situation as well, the outer filter layers may have larger pores or meshes than the inner filter layers. The number of filter layers 22, 27 is generally smaller in the case of the pleated filter cartridges 26 than in that of the wound filter cartridges 20. In addition to the inner support pipe 28, the pleated filter cartridge 26 also has an outer support pipe 29 having relatively large passage openings for the liquid. The outer support pipe 29 and accordingly an outer support fabric are necessary in view of the backwashing of the filter cartridges.

The course of the FILTRATION process is described by way of example below:

The FILTRATION program can be started only if the device or the control program of the control device 15 is in the standby mode. Preliminary filters 4, 5 and end filters 6, 7 are filled in sequence with the liquid to be filtered. Care is taken to make certain for each filter housing that only a brief period intervenes between the full signal ("housing filled") of vibration boundary switches and closing of the ventilation valves so that as little liquid as possible will be lost by way of the ventilation valves. At first both filter lines 2, 3 should be operated simultaneously at the full output which has been set. For example, the settings may call for a maximum of 3000 liters per hour per filter line 2, 3 or 6000 liters per hour in the aggregate.

Marking is made by control program means when a specific adjustable pressure differential is reached at one cartridge housing. The pump output is adjusted downward until half the discharge amount has been reached. The filter involved then switches automatically to the program sequence "empty wine." The two preliminary filters 4, 5 and the two end filters 6, 7 are sealed off from each other, so that only one preliminary filter 4 or 5 and/or one end filter 6 or 7 can switch simultaneously at a given time to the following "empty wine" sequence.

During the "empty wine" sequence, the liquid, wine in the exemplary embodiment, is first forced by compressed air blown into the housing by way of compressed air valves on the unfiltered side against the flow into the line of the filter which is still filtering. Care must be taken to make certain that the system pressure prepared by the pump is at all times lower than the air pressure required for emptying the housing. Experience has shown that a pressure differential of at least 1 bar is required for complete emptying. The air pressure needed may be set manually by a pressure reducer connected to the compressed air line. Emptying of the housing may be controlled by a level boundary switch. The inlet valve closes after expiration of a preset time.

In the second stage of the "empty wine" sequence, the filtrate side of the housing to be cleaned is emptied. The outlet valve closes after expiration of another period. The housing is now completely separated from the filtration path. If a marking for "cleaning" has also been applied for the other preliminary filter 4, 5 or end filter 6 or 7, such filter waits until cleaning of the first filter has ended and the filter is in the FILTRATION program again. If both preliminary filters 4, 5 or end filters 6, 7 reach the preset pressure differential simultaneously, the filters 4, 6 in the first filter line 2 shown in FIGS. 1 to 4 have priority. If cleaning of the first preliminary filter 4, for example, has been completed, the marking is erased and the preliminary filter 5 already marked begins cleaning.

The program sequence "empty wine" is followed by the program sequence "cleaning." The filter involved is backwashed with hot water in the direction opposite the direction of flow. This process is explained in brief for preliminary filter 4 of line 1:

Hot water flows by way of a water intake valve into the housing of the preliminary filter 4. Air escapes by way of the open ventilating valve. Once the housing has been filled, the ventilating valve closes and a moisture discharge valve opens. The preliminary filter 4 is backwashed over a period which is preset or established by program control means, the cover layer formed by filtration and particles penetrating the filter medium being dissolved and backwashed. In this way, the filter medium is regenerated, that is, the increased pressure differential detectable by the increase in the filtration resistance is reduced. The first backwashing phase is followed by an operation phase whose duration may be preset or determined by control program means and during which the moisture intake valves and the moisture discharge valves are closed. The operation phase is followed by a second backwashing phase during which the particles mechanically removed from the filter surface and/or chemically dissolved by the operation phase are washed out. The end of the backwash phase and/or the operation phase may, as an alternative or addition to a time-based control, also be controlled by the pressure differentials occurring at the filter involved.

The "cleaning" sequence is followed by the "empty water" sequence. The water intake valves are closed and the water discharge valves on the filtrate and non-filtrate side are opened. The water is forced from the housing by compressed air. The housing is cooled by injection of compressed air for a sufficiently long period and/or by cold water rinsing. In conclusion, the cleaned filter is filled with wine again in the "fill with wine" sequence. Once the full level has been reached and the ventilating valve closed again, the filter is in the FILTRATION sequence again.

While a preliminary filter 4, 5 and/or an end filter 6, 7 are in the "cleaning" sequence the pump output is regulated so that the pressure differentials at the filters going through the "FILTRATION" sequence do not exceed the preset value. The flow may be continuously adjusted down to a minimum value. For technical reasons, in some applications the output of the pump 17 may not be choked below the minimum value, since otherwise the starting torque of the pump 17 falls short. In addition, the device 1 automatically increases the through flow after cleaning has been completed and the cleaned filter has been refilled. When the pump 17 has been switched off, automatic restarting generally is not possible for control engineering reasons and considerations of safety. Automatic shutoff of the pump 17 always indicates a malfunction.

The desired execution of the program is monitored by pressure measurement (absolute or with reference to atmospheric pressure) upstream and downstream from the filter housing, by flow measurement at the outlet of the device 1, and/or by fill level measurement at each filter element 4, 5, 6, 7. If the measured parameters deviate from the assigned values, the pump 17 shuts down and a malfunction message is sent. The pump 17 is additionally secured from overly high pressure by a safety valve.

The "FILTRATION" program sequence may be halted in every phase by pressing of a "pause" button. The accessory sequences "empty-wine," "clean," "empty water," and "refill with wine" are also interrupted in the process. The pump 17 is switched off and all valves are closed. The message "FILTRATION has been stopped/FILTRATION may be restarted" appears on a display of the control console. After this message has been acknowledged the operator has the option either of continuing FILTRATION or of selecting "end production." Selection of another program sequence is not possible. After the "START FILTRATION" key has been pressed, FILTRATION continues from the point at which it had previously been stopped.

The course of the process for ending FILTRATION or for ending production is described by way of example below:

The "FILTRATION" process can be ended only by initiating the "end production" program. In this case the pump 17 is stopped immediately. The wine is then forced out by means of compressed air in the direction of flow from the preliminary filters 4, 5 into the end filters 6, 7 and then from the end filters 6, 7 out of the device 1. The message "separate inlet and outlet lines" then appears on the display. Since both the pump 17 and an outlet pipe section are rinsed by a fluxmeter in the "end production" program sequence, the lines for the filtered and unfiltered wine must be unscrewed. The message must be acknowledged manually by pressing of the corresponding key. Once this has happened, the filters 4, 5, 6, 7 initiate the "cleaning" sequence in succession in the order: first preliminary filter 4—second preliminary filter 5—first end filter 6—second end filter 7. The filters which were already in the "empty wine," "clean," or "empty water" during filtration discontinue operation and remain in the "ready" mode displayed.

After all filters 4, 5, 6, 7 have been rinsed with hot water, all are emptied simultaneously. The inlet, intermediate, and outlet lines of the device 1 are then rinsed, but this is accomplished preferably with cold water. While the inlet line is being rinsed, the pump 17 operates in the opposite direction at minimum speed. In this way the pump 17 is treated very gently. The inlet line, including the pump 17, and the outlet line are then emptied by means of compressed air. For this purpose the compressed air is forced through the first preliminary filter 4 or the first end filter 6 into the inlet or outlet line. During rinsing of the intermediate or transverse line 10 by corresponding valves connected between the water delivery line, filters 4, 5, 6, 7, and water drain line, compressed air is blown into the housing of the second preliminary filter 5 to prevent entry of rinse water into the cleaned filter.

As the last program step, all housings are preloaded with compressed air to prevent regermination and possible vacuum damage as the housing cools. The system is subsequently in the "standby" mode.

The course of the "cleaning" process is described by way of example below:

Backwashing with hot water or with filtrate from the preliminary filtration stage may be effected during FILTRATION. However, the complete "cleaning" program may also include rinsing with cold water. Individual steps of the program also run as sequences during the "FILTRATION" and "end production" programs as described in the foregoing. The complete "cleaning" program is then carried out only if it was started as an individual program in the "standby" mode of the device 1. After the "backwashing with hot water" and "empty water" steps, the housing is filled with cold water by the pertinent water intake valves. Then the entire device 1 is rinsed with cold water for a preset time in the direction of flow. Water is discharged by way of the pertinent water outlet valves. Rinsing with cold water is again followed by "emptying water." The system is then in the "standby" mode again.

Since both hot and cold water are used for rinsing in the "cleaning" individual program, but only one water line is available, only one filter 4, 5, 6, 7, and not two or more filters 4, 5, 6, 7, may be cleaned at any one time.

The course of the "sterilizing" process is described by way of example below:

In the "sterilizing" sequence, the housing is filled with hot water, and the water intake valves are rinsed in the direction of flow. The water is again discharged by way of the water outlet valves. As an alternative and/or in addition, the housings may also be rinsed or blown out with hot steam. All valves are operated in cycles (ON/OFF) during the sterilization period in order to be rinsed and sterilized. The procedure is the following:

First water is discharged by way of the water outlet valves of the end filters 6, 7. These valves are closed and the valves of the end filters 6, 7 on the inlet side are opened for brief preset periods. Once the valves on the inlet side have been closed again, the valves of the preliminary filters 4, 5 on the outlet side are opened for an equal period. The same takes place with the valves of the preliminary filter 4, 5 on the inlet side. After the valves of the preliminary filters 4, 5 have been closed, the ventilating valves of the preliminary filter 4, 5 are opened until the preliminary filters have been recharged. The ventilating valves are left in the open state for an additional preset period for the purpose of sterilization. These valves are then closed and the ventilating valves of the end filters 6, 7 are opened. Once the end filters 6, 7 have been recharged and the sterilization period for the ventilating valves of the end filters 6, 7 has expired, these valves are closed and the water outlet valves are again opened. This procedure is repeated until the total sterilization period for the device 1 has expired.

The inlet and outlet lines, together with the corresponding valves, and the intermediate or transverse line 10 with the accompanying cutoff valve are then sterilized. The pump 17 runs in reverse and feeds hot water through the inlet line. The pump 17 is also thereby sterilized. Consequently, all lines (inlet and outlet) must be disconnected for the "sterilizing" process. The message "disconnect inlet and outlet lines" is displayed after the "start" key for sterilization has been pressed. After this program step has been completed, all the valves close and the "empty water" sequence is carried out. Then, the housings are filled with cold water by way of the water intake valves and the entire device 1 is rinsed in the direction of flow. The water is discharged through the water outlet valves of the end filters 6, 7. The other water outlet valves are not cycled in cold water rinsing. Lastly, the "empty water" sequence is carried out. The device 1 is thereafter in the "standby" mode.

The course of the "operation by hot water" process is described by way of example below:

The system is completely filled with hot water by way of appropriate valves on the inlet side of the device 1 and is rinsed over a preset period until all housings and lines have assumed an appropriate temperature. The valves are then closed in succession in the direction from outlet to inlet, so that the housings filled with hot water are under high pressure. First the water outlet valves of the end filters 6, 7 are closed, then the valves of the end filters 6, 7 on the inlet side, the connection valves between preliminary filters 4, 5 and end filters 6, 7, and lastly the inlet-side valves of the preliminary filters 4, 5. Consequently, the housings are subjected to the pressure provided by the water line. Supplementary injection of compressed air is no longer necessary.

Contaminants, chiefly colloids, are removed from the filter medium by the action of hot water at a temperature of at least 60° C. Consequently, action overnight after "end of production" is recommended, along with optional cleaning, in order to rinse the separated matter from the housing. After the water-action period has ended, the "empty water" sequence is started and the device 1 is again in the "standby" mode.

The course of the "chemical cleaning" process is described by way of example below:

Initiation of the "chemical cleaning" program causes backlocking, so that FILTRATION is possible again only after full completion of the "chemical cleaning" program. The purpose of such backlocking is to prevent the system from starting filtration after interruption of chemical cleaning without the cleaning agent having been thoroughly removed from the housing. If interruption has occurred, this backlocking may be removed also by execution of the sequence "cleaning (individual)."

If the control command "chemical cleaning" has been selected exclusively for a specific filter, for example, by manual entry at the control console, the water outlet valve on the filtrate side and the ventilating valve belonging to this filter are opened. The message "separate drain lines and connect cleaning lines" appears on the display. The intake line and drain line for the cleaning means are connected to the valve at the appropriate places. Acknowledgment is followed by a new message: "turn on cleaning pump."

This cleaning pump is not under the control of the control system of the device 1, and accordingly does not constitute a direct component of the device 1. It is made ready by the operator of the device 1, and is manually operated. After the cleaning pump has been turned on and the message has been acknowledged, the control device monitors reaching of the filling level required. Once the filling level has been reached, the ventilating valve closes and the outlet valve opens. The cleaning means is then delivered "in the circuit." After the set cleaning period has expired, a pertinent message is sent. After the message has been acknowledged, another message, "turn off cleaning pump," is sent. After repeated acknowledgment the message "reconnect drain water lines" appears. This protection by messages, which must be acknowledged, guides the user with certainty through the course of the "chemical cleaning" program sequence. After the last message has been acknowledged, the housing containing the chemically cleaned filter is automatically emptied; the "cleaning" sequence follows. The backlocking is removed again by complete execution of the "cleaning" sequence. After the "cleaning" sequence has been completed, the housing is emptied again and the system displays the "standby" status.

While various embodiments have been chosen to illustrate the invention, it will be understood by those skilled in the art that various changes and modifications can be made therein without departing from the scope of the invention as defined in the appended claims.

What is claimed is:

1. A method of filtering liquids with a filtration device having at least first and second filter lines and having at least one preliminary filter unit and at least one end filter unit in each of the filter lines, each of the filter units being insertable and removable from fluid communication with the respective filter line and being regenerated independently of one another, the method comprising the steps of:
    measuring pressure differential at at least one filter unit in each of the filter lines;
    reducing volume flow of liquid to be filtered entering the filtration device when a preset limiting value for the pressure differential measured is reached in one filter unit;
    after reducing the volume flow, disengaging the one filter unit from fluid communication with the respective filter line, conveying the reduced volume flow through at least one filter unit in the other filter line, and conveying the reduced volume flow through a third line connecting the first and second filter lines between the preliminary filter units and the end filter units thereof;
    regenerating the filter unit which was disengaged;
    re-engaging the filter unit which was regenerated into fluid communication the respective filter line; and
    increasing the volume flow of liquid to be filtered into the filtration device after re-engagement of the filter unit which was regenerated.

2. A method according to claim 1 wherein
    prior to increasing the volume flow, at least one filter unit in the other filter line is regenerated.

3. A method according to claim 1 wherein
    water at a temperature higher than 60% is used for regeneration of the filter units.

4. A method according to claim 1 wherein
    during regeneration of one of the filter units, regeneration fluid flow through the filter unit being regenerated has an approach flow velocity at least as great as an approach flow velocity during filtration.

5. A method according to claim 1 wherein
    pressure differential is measured during backwashing of the filter unit being regenerated.

6. A method according to claim 1 wherein
    the flow volume of the liquid to be filtered entering the filtration device is adjusted based on a measured concentration of particles in the liquid to be filtered.

7. A method according to claim 6 wherein
    the concentration of particles is determined by measuring turbidity of the liquid to be filtered.

8. A method according to claim 1 wherein
    the volume flow entering the filtration device is adjusted continuously as a function of filterability of the liquid to be filtered.

9. A method according to claim 1 wherein
    the volume flow entering the filtration device is adjusted gradually as a function of filterability of the liquid to be filtered.

10. A method according to claim 1 wherein
    the volume flow entering the filtration device is adjusted by a pump.

11. A method according to claim 1 wherein
    the disengaging and re-engaging of the filter units and the decreasing and increasing of the volume flow of the liquid to be filtered entering the filtering device is automatically controlled by a control device.

12. A method according to claim 1 wherein
    the liquid to be filtered is a drink.

13. A device for filtering liquids, comprising
    first and second filter lines extending in parallel between an inlet and an outlet;
    a preliminary filter unit and an end filter unit located in series in each of said filter lines;
    a pressure sensor for measuring a pressure differential through at least one of said filter units in each of said filter line;
    a flow volume control for adjusting flow volume of liquid to be filtered connected to said inlet;
    a control device connected to said pressure sensor and said flow volume control and adjusting said flow volume control based on pressure sensed by said pressure sensor to reduce the flow volume of the liquid to be filtered when a preset pressure differential is reached;
    flow regulators for disconnecting and reconnecting one of said filter units from fluid communication with the respective filter line, and for conveying a reduced flow of liquid to be filtered to the corresponding filter unit in the other filter line;
    a third line connecting the first and second filter lines between the preliminary filter units and the end filter units for conveying liquid; and
    means for regenerating one of said filter units which has been disconnected.

14. A device according to claim 13 wherein
said flow regulators comprise valves in said lines.

15. A device according to claim 13 wherein
said flow volume control is a pump.

16. A device according to claim 13 wherein
a sensor is connected to said inlet to determine concentration of particles in the liquid to be filtered.

17. A device according to claim 16 wherein
said sensor is an optical sensor measuring turbidity of the liquid to be filtered.

18. A device according to claim 13 wherein
the filter units are at least one of wound filter cartridges, pleated filter cartridges and depth filter cartridges.

19. A device of filtering liquids, comprising
at least first and second filter lines extending in parallel between an inlet and an outlet;
at least one preliminary filter unit and at least one end filter unit in each of the filter lines, each of the filter units being insertable and removable from fluid communication with the respective filter line and being regenerated independently of one another;
means for measuring pressure differential at at least one filter unit in each of the filter lines;
means for reducing volume flow of liquid to be filtered entering the inlet when a preset limiting value for the pressure differential measured is reached in one filter unit;
means for disengaging the one filter unit from fluid communication with the respective filter line after reducing the volume flow, for conveying the reduced volume flow through at least one filter unit in the other filter line, and for conveying the reduced volume flow through a line connecting the first and second filter lines between the preliminary filter units and the end filter units thereof;
means regenerating the filter unit which was disengaged;
means for re-engaging the filter unit which was regenerated into fluid communication with the respective filter line; and
means for increasing the volume flow of liquid to be filtered into the filtration device after the re-engagement of the filter unit which was regenerated.

20. A device according to claim 19 wherein
the means for reducing the flow volume of the liquid to be filtered entering the filtration device is controlled by a sensor measuring concentration of particles in the liquid to be filtered.

21. A device according to claim 19 wherein
the means for reducing and increasing the volume flow is a pump.

* * * * *